US 6,743,520 B2

(12) United States Patent
Street et al.

(10) Patent No.: US 6,743,520 B2
(45) Date of Patent: Jun. 1, 2004

(54) POLYMERIC FILM

(75) Inventors: Andrew Street, Northamptonshire (GB); Allan Lovatt, Middlesbrough (GB); Jane Constance Campbell, Middlesbrough (GB); Hikaru Takeuchi, Kanagawa (JP); Sumio Wakabayashi, Ibaraki (JP); Yasuo Fujieda, Ibaraki (JP)

(73) Assignee: DuPont Teijin Films US Ltd. Partnership, Wilmington, DE (US)

( * ) Notice: Subject to any disclaimer, the term of this patent is extended or adjusted under 35 U.S.C. 154(b) by 38 days.

(21) Appl. No.: 10/311,610

(22) PCT Filed: Jun. 26, 2001

(86) PCT No.: PCT/US01/20292

§ 371 (c)(1), (2), (4) Date: Dec. 17, 2002

(87) PCT Pub. No.: WO02/00785

PCT Pub. Date: Jan. 3, 2002

(65) Prior Publication Data

US 2004/0009361 A1 Jan. 15, 2004

(51) Int. Cl.$^7$ .......................... B32B 27/08; B32B 27/18; B32B 27/26; B32B 27/30; B32B 27/36

(52) U.S. Cl. ............................... 428/483; 428/355 AC; 428/480; 428/522; 526/287; 526/318; 526/318.3; 526/318.4; 526/318.41; 526/318.44; 526/318.5; 526/319; 526/328; 526/329; 526/329.5; 526/329.7; 525/206; 525/221; 525/222; 525/227; 525/228; 525/230

(58) Field of Search ..................... 428/355 AC, 343, 428/480, 483, 522; 526/287, 318, 318.3, 318.4, 318.41, 318.44, 318.5, 319, 328, 329, 329.5, 329.7; 524/206, 221, 222, 227, 228, 230

(56) References Cited

U.S. PATENT DOCUMENTS

| 3,919,154 A | | 11/1975 | Chang et al. | |
|---|---|---|---|---|
| 3,926,888 A | | 12/1975 | Cheung et al. | |
| 3,928,273 A | | 12/1975 | Chang et al. | |
| 4,500,598 A | * | 2/1985 | Thoese | 428/331 |
| 4,604,414 A | * | 8/1986 | Kato et al. | 524/139 |
| 4,699,964 A | * | 10/1987 | Kato et al. | 526/193 |
| 4,880,700 A | * | 11/1989 | Charmot et al. | 428/337 |
| 4,908,277 A | * | 3/1990 | Tsunashima et al. | 428/480 |
| 5,035,945 A | * | 7/1991 | Hart | 428/323 |
| 5,096,784 A | * | 3/1992 | Culbertson et al. | 428/482 |
| 5,102,734 A | * | 4/1992 | Marbrow et al. | 428/349 |
| 5,114,739 A | * | 5/1992 | Culbertson et al. | 427/536 |
| 5,306,606 A | * | 4/1994 | Tachibana et al. | 430/533 |
| 5,474,638 A | * | 12/1995 | Kohlhammer et al. | 156/308.2 |
| 5,906,888 A | * | 5/1999 | Hart | 428/323 |

FOREIGN PATENT DOCUMENTS

| DE | 25 24 432 | | 4/1975 |
|---|---|---|---|
| EP | 0 035 614 A1 | | 9/1981 |
| EP | 0 357 196 | * | 3/1990 |
| EP | 0 429 179 A2 | | 5/1991 |

* cited by examiner

*Primary Examiner*—Vivian Chen

(57) ABSTRACT

A primer useful in the preparation of an anti-fouling surface contains (I) a copolymer formed from acrylates, free carboxyl group containing monomer and an aromatic sulfonic acid or salt, an acrylic polymeric resin and a cross-linking agent.

16 Claims, No Drawings

POLYMERIC FILM

BACKGROUND OF THE INVENTION

The present invention is concerned with a primer composition for a polymeric film and a primed polymeric film suitable for use in the preparation of an anti-fouling surface.

The pollution of the environment, and in particular air pollution, represents a problem for exterior surfaces exposed to the atmosphere. The materials used in the construction of the exterior surfaces of, for example, buildings, vehicles and other man-made structures, may become contaminated as a result of pollutants present in the atmosphere. Particulate material present in the atmosphere, such as dust, combustion products and inorganic material (for example clay particles), is deposited on the outer surfaces of buildings and vehicles. Upon exposure to rainfall, such deposits, as well as particles present in rainwater, flow with the rainwater across these outer surfaces. The deposits may become ingrained in the material of the exterior surface of the building and the building becomes soiled. Such contamination is particularly problematic for constructions that are in close proximity to vehicular traffic and also for the exterior surfaces of the vehicles themselves. The fouling of the exterior surfaces of the windows and mirrors of vehicles is a particular problem.

Various means of combating this problem have previously been disclosed. For instance, EP-0903389-A discloses an anti-fouling composition having a hydrophobic component and a hydrophilic component. The hydrophilicity is induced by a photocatalyst component. In one embodiment, EP-0903389-A discloses a composition comprising a photocatalytic oxide such as titanium dioxide, a silicone resin or silica and a water-repellent fluororesin. The composition may be coated onto the surface of a substrate, such as metal, ceramic, glass, plastic, wood, stone, cement, concrete, fibres and fabrics, in accordance with known coating techniques for the purpose of imparting an anti-fouling property to the substrate.

For reasons of economy and convenience, it is usually desirable to prepare the anti-fouling composition at a location that is remote from the article to which it is to be applied. For this reason it is desirable to provide a film structure comprising the anti-fouling composition as a coating on a base film. The coated base film would then be transported to the location of the article or surface to be protected, which may comprise any of the surfaces mentioned above, and the film laminated or adhered thereto. However, it is difficult to obtain a satisfactory and long-lasting adhesion between the base film and the anti-fouling coating composition, which is often silicone-based. In addition, known films often suffer from poor weatherability and, over time, may become brittle and/or show deterioration in optical properties and/or colour. Thus, on ageing a film may develop microcracks as a result of weathering which will accelerate film degradation, increase haze, promote brittleness and cause a deterioration in inter-layer adhesion.

It is an object of this invention to provide a primer composition for coating onto a film substrate for improving the adhesion characteristics between the film substrate and an anti-fouling coating composition. It is a further object of this invention to provide a film which exhibits improved adhesion to an anti-fouling composition. It is a further object of this invention to provide a film substrate suitable for use as a base film for an anti-fouling composition. It is a further object of this invention to provide a film which exhibits improved UV stability and weatherability.

SUMMARY OF THE INVENTION

According to a first aspect of the present invention, there is provided a composition comprising:

(i) a copolymer of (a) 35 to 40 mole % alkyl acrylate, (b) 35 to 40% alkyl methacrylate, (c) 10 to 15 mole % of a comonomer containing a free carboxyl group, and (d) 15 to 20 mole % of an aromatic sulphonic acid and/or salt thereof;

(ii) an acrylic and/or methacrylic polymeric resin; and (iii) a cross-linking agent.

The composition is suitable for use as a primer coating on a polymeric film substrate, particularly a film substrate for an anti-fouling coating composition. The primer layer performs the function of compatabilising the substrate layer and any subsequent layers, i.e. the anti-fouling coating or any intermediate layer(s), in order to provide good adhesion. The primed film of the present invention exhibits improved adhesion in relation to known films. It is believed that the primer coating is more hydrophilic than known coatings and that this increases adhesion to the anti-fouling composition. It is not, however, intended that the invention be limited by this theory. The primed film of the present invention also exhibits excellent weatherability and UV stability.

DETAILED DESCRIPTION OF THE INVENTION

In a preferred embodiment, the composition of the present invention is suitable for improving adhesion between a polymeric film substrate, particularly a polyester film substrate, and a silicone-based anti-fouling composition, particularly one having a hydrophilic component therein.

In a preferred embodiment of the invention, the primer composition of the present invention is a dispersion of components (i), (ii) and (iii) in water. In an alternative embodiment, the composition is a solution or suspension of components (i), (ii) and (iii) in an organic solvent.

Preferably, component (i) is present in amounts from about 0.1 to about 15%, and preferably from about 2 to about 6%, by weight of the total solids present in the composition. Preferably, component (ii) is present in amounts of about 0.1 to about 10%, and preferably about 1 to about 5%, by weight of the total solids present in the composition. Preferably, component (iii) is present in amounts of about 0.01 to about 3%, and preferably about 0.2 to about 1%, by weight of the total solids present in the composition.

Preferred copolymers of component (i) are as follows.

The alkyl group of monomer (a) is preferably a lower alkyl group, for example an alkyl group containing up to six carbon atoms such as methyl, ethyl, n-propyl, isopropyl, n-butyl, isobutyl, terbutyl, and hexyl. Ethyl acrylate is a particularly preferred monomer (a).

The alkyl group of monomer (b) is preferably a lower allyl group, for example an alkyl group containing up to six carbon atoms such as methyl, ethyl, n-propyl, isopropyl, n-butyl, terbutyl, and hexyl. Methyl methacrylate is a particularly preferred monomer (b).

Monomer (c) containing a free carboxyl group, i.e. a carboxyl group other than those involved in the polymerisation reaction by which the copolymer is formed, suitably comprises a copolymerisable unsaturated carboxylic acid, and is preferably selected from acrylic acid, methacrylic acid, maleic acid, and/or itaconic acid; with acrylic acid and itaconic acid being particularly preferred.

The aromatic sulphonic acid monomer (d) may be present in the copolymer as the free acid and/or a salt thereof, for example as the ammonium, substituted ammonium or alkali metal (such as lithium, sodium or potassium) salt. The sulphonate group does not participate in the polymerisation reaction by which the copolymer is formed. The use of non-aromatic sulphonate-containing monomers can result in poor antistatic properties of the coated film, and also in destabilisation of the copolymer emulsion during polymerisation, rendering the water sensitivity of the copolymer unacceptable. The aromatic sulphonic acid polymer is preferably p-styrene sulphonic acid and/or a salt thereof.

Component (i) is preferably a copolymer comprising comonomers (a) 35 to 37.5 mole % alkyl acrylate, (b) 35 to 37.5 mole % allcyl methacrylate, (c) 10 to 15 mole % of a monomer containing a free carboxyl group, and (d) 15 to 20 mole % of an aromatic sulphonic acid and/or a salt thereof. A particuLlarly preferred copolymer comprises ethyl acrylate/ruethyl methacrylate/itaconic acid/p-styrene sulphonic acid and/or a salt thereof in a ratio of 35/35/15/15 mole %, and especially in a ratio of 37.5/37.5/10/15 mole %.

The weight average molecular weight of the copolymer may vary over a wide range, but is preferably from 10,000 to 10,000,000, and more preferably of the order of 1,000,000.

Component (ii) of the composition is an acrylic and/or methacrylic polymeric resin. Suitable polymers comprise at least one monomer derived from an ester of acrylic acid, preferably an alkyl ester wherein the alkyl group is a $C_{1-10}$ allyl group, such as methyl, ethyl, n-propyl, isopropyl, n-butyl, isobutyl, t-butyl, hexyl, 2-ethylhexyl, heptyl and n-octyl, and more preferably ethyl and butyl. Polymers comprising alkyl acrylate monomer units and further comprising alkyl methacrylate monomer units are particularly preferred. In a particularly preferred embodiment, the polymer comprises ethyl acrylate and alkyl methacrylate. Preferably, the alkyl methacrylate is methyl methacrylate. In a preferred embodiment, the alkyl acrylate monomer units are present in a proportion in the range of from about 30 to about 65 mole % and the alkyl methacrylate monomer units are present in a proportion in the range of from about 20 to about 60 mole %.

Other monomer units which may be present in the polymeric resin of component (ii) include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methylacrylamide, N-tertiary butyl acrylamide, hydroxyethyl methacrylate, glycidyl acrylate, glycidyl methacrylate, dimethylamino ethyl methacrylate, itaconic acid, itoconic anhydride and half ester of itaconic acid.

Further monomer units which may be present in the polymeric resin of component (ii) include vinyl esters such as vinyl acetate, vinyl chloracetate and vinyl benzoate, vinyl pyridine, vinyl chloride, vinylidene chloride, maleic acid, maleic anhydride, styrene and derivatives of styrene such as chlorostyrene, hydroxystyrene and alkylated styrenes wherein the alkyl group is a $C_{1-10}$ alkyl group.

In a preferred embodiment, the polymer of component (ii) comprises about 35 to 60 mole % ethyl acrylate, about 30 to 55 mole % methyl methacrylate and about 2 to 20 mole % methacrylamide.

Preferably, the molecular weight of the polymer of component (ii) is from about 40,000 to about 300,000, and more preferably from about 50,000 to about 200,000.

The cross-linking agent of component (iii) functions to cross-link the composition to improve adhesion to a substrate and should also be capable of internal cross-linking within the composition. Suitable cross-linking agents include epoxy-resins, alkyd resins, amine derivatives (such as hexamethoxymethylmelamine) and condensation products of an amine (such as melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines) with an aldehyde, for example formaldehyde. A preferred cross-linking agent is a condensation product of melamine with formaldehyde. The condensation product is optionally alkoxylated, for example methoxylated or ethoxylated. Particularly preferred cross-linking agents are selected from oxazoline-modified addition polymers containing pendant oxazoline groups, such as those disclosed in, for example, U.S. Pat. Nos. 4,474,923 and 4,508,869 and commercially available as EPOCROS™ cross-linking agents (Nippon Sholcubai Co. Ltd).

In a preferred embodiment, the composition further comprises a cross-linking catalyst to facilitate the cross-linking of the cross-linking agent. Preferred catalysts for the embodiment of the invention wherein the cross-linker comprises melamine formaldehyde or a derivative thereof include ammonium chloride, ammonium nitrate, ammonium thiocyanate, ammonium dihydrogen phosphate, ammonium sulphate, diammonium hydrogen phosphate, para-toluene sulphonic acid, maleic acid stabilised by reaction with a base, and morpholinium para-toluene sulphonate.

According to a second aspect of the invention, there is provided a film comprising a substrate layer and a primer layer, said primer layer being a composition according to the first aspect of the invention. The film is suitable for use as a base layer onto which an anti-fouling composition may be coated.

The substrate may be formed from any suitable film-forming material. Thermoplastic polymeric materials are preferred. Such materials include a homopolymer or copolymer of a 1-olefin, such as ethylene, propylene and but-1-ene, a polyamide, a polycarbonate, PVC, PVA, polyacrylates, celluloses and particularly a synthetic linear polyester.

The synthetic linear polyesters useful as the substrate may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, eg ethylene glycol, 1,3-propanediol, 1,4-butanediol, neopentyl glycol and 1,4-cyclohexanedimethanol. An aliphatic glycol is preferred.

In a preferred embodiment, the polyester is selected from polyethylene terephthalate and polyethylene naphthalate. Polyethylene terephthalate (PET) is particularly preferred.

In a further preferred embodiment the polyester is a copolyester of terephthalic acid (TPA) and isophthalic acid (IPA) with one or more diols selected from the group consisting of aliphatic and cycloaliphatic diols. In this embodiment, the preferred molar ratios of the isophthalate polyester units to the terephthalate polyester units are from 0.1 to 40 mol % isophthalate and from 99.9 to 60 mol % terephthalate, preferably from 15 to 20 mol % isophthalate and from 85 to 80 mol % tereplithalate. The terephthalic acid/isophthalic acid copolyester may be obtained by condensation polymerisation of terephthalic acid and isophthalic acid with the diol. Suitable aliphatic diols include ethylene glycol, 1,3-propane diol, 1,3-butane diol, 1,4-butane diol, 1,5-pentane diol, neopentyl glycol and 1,6-hexane diol. Suitable cycloaliphatic diols include 1,4-cyclohexanedimethanol and 1,4-cyclohexane diol. It is preferred that the copolyester is derived from ethylene glycol. Thus, in this embodiment, the preferred polyester is a copolyester of ethylene isophthalate and ethylene terephthalate (referred to herein as PE-TPA/IPA), preferably comprising from 0.1 to 40 mol % ethylene isophthalate and from 99.9 to 60 mol % ethylene terephthalate and more preferably from 15 to 20 mol % ethylene isophthalate and 85 to 80 mol % ethylene terephthalate. In a particularly preferred embodiment the second layer comprises a copolyester comprising substantially 18 mol % ethylene isophthalate and 82 mol % ethylene terephthalate.

A TPA/IPA copolyester tends to reduce the crystallinity of the film in relation to a film comprising, for example PET, which is an important factor when it is desired to improve the weatherability or UV stability, particularly with regard to the brittleness, of the film.

The substrate may also comprise a polyarylether or thio analogue thereof, particularly a polyaryletherketone, polyarylethersulphone, polyaryletheretherketone, polyaaryletherethersulphone, or a copolymer or thioanalogue thereof. Examples of these polymers are disclosed in EP-A-001879, EP-A-0184458 and U.S. Pat. No. 4,008,203 and include polymers sold as STABAR® (ICI plc). Blends of such polymers may also be employed.

The substrate may comprise one or more discrete layers of the above film-forming materials. For instance, the substrate may comprise one, two, three, four or five or more layers. The polymeric materials of the respective layers may be the same or different. In a preferred embodiment, the film may comprise a multilayer substrate comprising two or three, preferably two, different types of layer. Typical multilayer structures may be of the AB, ABA, ABC, ABABA or ABCBA type.

Where the substrate comprises more than one layer, preferably at least one of the layers comprises a polymer selected from polyethylene terephthalate (PET), polyethylene naphthalate (PEN) and a TPA/IPA copolyester as described above.

For example, where the substrate comprises a two layer AB structure or a three layer ABA structure or a five layer ABABA structure, the substrate may comprise the following combinations of layers: A=PET, B=PET; A=PET, and B=PE-TPA/IPA; A=PE-TPA/IPA and B=PET; A=PE-TPA/IPA and B=PE-TPA/IPA; and the corresponding combinations wherein PET is replaced by PEN. Where the substrate comprises a three layer ABC structure or a five layer ABCBA structure, the substrate may comprise combinations of layers wherein A and B are as defined above and C is PE-TPA/IPA or polyethylene isophthalate.

Formation of the substrate may be effected by conventional techniques well-known in the art. Conveniently, formation of the substrate is effected by extrusion, in accordance with the procedure described below. In general terms the process comprises the steps of extruding a layer of molten polymer, quenching the extrudate and orienting the quenched extrudate in at least one direction.

The substrate may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the substrate-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film and its intended application but should not be selected so as to substantially degrade the tear resistant properties of the film. Within these constraints, a heat set temperature of about 135° to 250° C. is generally desirable, as described in GB-A-838708.

Where the substrate comprises more than one layer, preparation of the substrate is conveniently effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a multilayer polymeric film, which may be oriented and heat-set as hereinbefore described. Formation of a multilayer substrate may also be effected by conventional lamination techniques, for example by laminating together a preformed first layer and a preformed second layer, or by casting, for example, the first layer onto a preformed second layer.

The substrate is suitably of a thickness between about 12 and 300 μm, preferably from 20 to about 150 μm and particularly from about 30 to about 70 μm.

The ratio of substrate to primer layer thickness may vary within a wide range, although the thickness of the primer layer preferably should not be less than 0.004% nor greater than 10% of that of the substrate. In practice, the thickness of the primer layer is desirably from about 0.01 μm to about 10 μm, and preferably from about 0.1 μm to about 5 μm. Generally the primer layer is not more than about 1.0 μm.

The substrate and/or the primer composition preferably comprise one or more UV absorbers in order to improve the ageing characteristics of the film, and in particular to reduce the tendency of the film to become brittle over time. In principle, any organic or inorganic UV absorber, particularly one which is suitable for use with polyester, may be employed in the present invention. Suitable examples include the organic UV absorbers disclosed in Encyclopaedia of Chemical Technology, Kirk-Othmer, Third Edition, John Wiley & Sons, Volume 23, Pages 615 to 627. Particular examples of UV absorbers include benzophenones, benzotriazoles (U.S. Pat. Nos. 4,684,679, 4,812,498 and 4,681,905), benzoxazinones (U.S. Pat. Nos. 4,446,262, 5,251,064 and 5,264,539), triazines (U.S. Pat. Nos. 3,244,708, 3,843,371, 4,619,956, 5,288,778 and WO 94/05645) and hindered amines. The teaching of the aforementioned documents is incorporated herein by reference.

Preferably, the UV absorber is non-volatile and does not cause excessive yellowing of the product.

In a preferred embodiment of the invention the UV absorber comprises one or more triazines, more preferably hydroxyphenyltriazines, and particularly hydroxyphenyltriazine compounds of Formula 1:

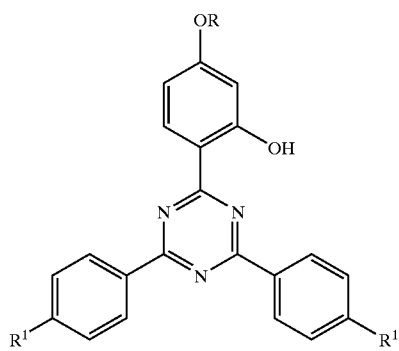

(1)

wherein R is hydrogen, $C_1$–$C_{18}$ alkyl, $C_2$–$C_6$ alkyl substituted by halogen or by $C_1$–$C_{12}$ alkoxy, or is benzyl and $R^1$ is hydrogen or methyl. R is preferably $C_1$–$C_{12}$ alkyl or benzyl, more preferably $C_3$–$C_6$ alkyl, and particularly hexyl. $R^1$ is preferably hydrogen. An especially preferred UV absorber is 2-(4,6-diphenyl-1,3,5-triazin-2-yl)-5-(hexyl)oxy-phenol, which is commercially available as Tinuvin™ 1577 FF from Ciba-Additives.

Further examples of a preferred UV absorber are benzylidene malonate ester (commercially available as Sanduvor™ PR-25 from Sandoz), and benzoxazinone (commercially available as Cyasorb™ 3638 from Cytec).

In one embodiment of the invention, a UV absorber may be chemically incorporated in the chain of a layer-forming polyester. Preferred UV-stable polyesters are produced by incorporating benzophenones into the polyester, for example as described in EP-A-0006686, EP-A-0031202, EP-A-0031203 and EP-A-0076582, the teaching of which is incorporated herein by reference.

In a further embodiment of the invention, a UV absorber may be chemically incorporated into the chain of a polymer contained in the primer composition. For instance, the acrylic and/or methacrylic polymeric resin of component (ii) described herein may comprise a UV-absorbent functional group such as a benzotriazole. Suitable acrylate resins containing a UV-absorbent functional group are commercially available as SAIVINOL™ (Saiden Chemical Industry Co.). Typically, the UV functional group is present at a level of up to about 45%, and generally about 35%, by weight of the total amount of UV functional group-containing acrylate resin present in the primer composition. Examples of suitable acrylate copolymers include EA/MMA; BA/MMA; EHA/MMA; EA/BA/MMA; EHA/BA/MMA; BA/MMA/MAA; BA/MMA/AA; BA/MMA; and BA/MMA/2-HEMA, wherein EA=ethylacrylate; MMA-methylmethacrylate; BA=butylacrylate; EHA=2-ethylhexylacrylate; MAA=methacrylic acid; AA=acrylic acid; and 2-HEMA=2-hydroxyethylmethacrylate.

Suitable inorganic UV absorbers include metal oxide particles, such as zinc oxide or titanium dioxide, having a mean crystal size, as determined by electron microscopy, of less than 200 nm, more preferably in the range from 5 to 150 nm, particularly 10 to 100 nm, and especially 15 to 40 nm. Titanium dioxide particles are particularly preferred.

The titanium dioxide particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as the chloride process or the sulphate process.

In one embodiment of the invention the titanium dioxide particles are coated, preferably with inorganic oxides such as aluminium, silicon, zinc, magnesium or mixtures thereof. Preferably the coating additionally comprises organic compound(s), such as fatty acids and preferably alkanols, suitably having from 8 to 30, preferably from 12 to 24 carbon atoms. Polydiorganosiloxanes or polyorganohydrogensiloxanes, such as polydimetlhylsiloxane or polymethylhydrogensiloxane are suitable organic compounds. The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate. The coating layer on the titanium dioxide particles is preferably in the range from 1 to 12%, more preferably 2 to 6% of inorganic oxides, and preferably in the range from 0.5 to 3%, and more preferably 0.7 to 1.5% of organic compound, by weight based upon the weight of titanium dioxide.

Where the substrate comprises more than one layer, the UV absorber(s) may be present in one or more or all layers of the substrate. The respective layers of the substrate may comprise the same or different UV absorber(s).

The amount of UV absorber incorporated into a layer is generally in the range from 0.1% to 10%, more preferably 0.5% to 9%, more preferably 1.2% to 8%, particularly 2% to 6%, and especially 3.2% to 5.5% by weight, relative to the weight of the polymer of that layer. It should be noted that certain inorganic UV stabilisers such as metal oxides, particularly titanium dioxide, are also suitable for use as particulate fillers, as described herein below, and may therefore be present in amounts above 10% by weight of the polymer. In situations where such materials are utilised, the amount of, for example, titanium dioxide will generally be determined by the desired appearance of the film (e.g. opaque or optically clear), as described herein below.

In one embodiment of the invention, both an organic UV absorber, preferably a triazine, and an inorganic UV absorber, preferably titanium dioxide, are present. The ratio, by weight of inorganic to organic UV absorber is preferably in the range from 0.5 to 10:1, more preferably 1 to 5:1, and particularly 1.5 to 2.5:1.

One or more of the layers of the polymeric film according to the invention may conveniently contain any of the additives conventionally employed in the manufacture of polymeric films. Thus, agents such as dyes, pigments, voiding agents, lubricants, anti-oxidants, radical scavengers, thermal stabilisers, anti-blocking agents, surface active agents, slip aids, optical brighteners, gloss improvers, prodegradents, viscosity modifiers and dispersion stabilisers may be incorporated in the substrate and/or primer layer(s) as appropriate. In particular the substrate and/or primer layer, may comprise a particulate filler. The filler may, for example, be a particulate inorganic filler or an incompatible resin filler or a mixture of two or more such fillers.

By an "incompatible resin" is meant a resin which either does not melt, or which is substantially immiscible with the polymer, at the highest temperature encountered during extrusion and fabrication of the layer. The presence of an incompatible resin usually results in a voided layer, by which is meant that the layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule. Preferred materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate layer polyester.

Preferred particulate inorganic fillers include titanium dioxide, such as hereinbefore described, and silica.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 $\mu$m, more preferably 0.05 to 1.5 $\mu$m, and particularly 0.15 to 1.2 $\mu$m.

The size distribution of the inorganic filler particles is also an important parameter, for example the presence of excessively large particles can result in the film exhibiting unsightly 'speckle', i.e. where the presence of individual filler particles in the film can be discerned with the naked eye. It is preferred that none of the inorganic filler particles incorporated into the substrate layer should have an actual particle size exceeding 30 $\mu$m. Particles exceeding such a size may be removed by sieving processes which are known in the art. However, sieving operations are not always totally successful in eliminating all particles greater than a chosen size. In practice, therefore, the size of 99.9% by number of the inorganic filler particles should not exceed 30 $\mu$m, preferably should not exceed 20 $\mu$m, and more preferably should not exceed 15 $\mu$m. Preferably at least 90%, more preferably at least 95% by volume of the inorganic filler particles are within the range of the volume distributed median particle diameter ±0.8 $\mu$m, and particularly ±0.5 $\mu$m.

Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

If employed in the primer layer, the filler particles may comprise from about 20 to about 200%, and more preferably 50 to 150% by weight of the primer layer relative to the weight of the polymer of the primer layer.

The substrate of the polymeric film may also comprise one or more plasticisers, such as glycerol or ethylene glycol or other conventional plasticiser known in the art. The plasticisers may be beneficial in the reduction of the amount of UV absorber(s) lost from the structure.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In a preferred embodiment, the substrate layer of the present invention is optically clear, preferably having a % of scattered visible light (haze) of <6%, more preferably <3.5% and particularly <2%, measured according to the standard ASTM D 1003. In this embodiment, filler is typically present in only small amounts, generally not exceeding 0.5% and preferably less than 0.2% by weight of the substrate. A preferred filler in this embodiment is Aerosil™ OX50 which is typically used in amounts of about 0.0002%.

In an alternative embodiment of the invention, the substrate layer is opaque and highly filled, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. The substrate layer is conveniently rendered opaque by incorporation into the polyester blend of an effective amount of an opacifying agent. Suitable opacifying agents include an incompatible resin filler, a particulate inorganic filler or a mixture of two or more such fillers, as hereinbefore described. The amount of filler present in an opaque substrate layer is preferably in the range from 1% to 30%, more preferably 3% to 20%, particularly 4% to 15%, and especially 5% to 10% by weight, based on the weight of the substrate layer polymer.

The surface of an opaque substrate layer preferably has the following CIE laboratory colour co-ordinate values for L*, a* and b*, measured as herein described. The L* value is suitably greater than 85, preferably in the range from 90 to 100, more preferably 93 to 99, and particularly 95 to 98.

The a* value is preferably in the range from −2 to 3, more preferably −1 to 2, particularly 0 to 1.5, and especially 0.3 to 0.9. The b* value is preferably in the range from −10 to 0, more preferably −10 to −3, particularly −9 to −5, and especially −8 to −7.

The colour co-ordinate values may be modified by the incorporation of suitable dyes, such as a blue and/or magenta dye(s), into the film-forming polyester. For example a blue dye may be used, preferably at a concentration in the range from 10 to 1000 ppm, more preferably 30 to 500 ppm, particularly 50 to 200 ppm, and especially 100 to 150 ppm, relative to the weight of the polyester. Alternatively, or in addition, a magenta dye may be employed, preferably at a concentration in the range from 2 to 200 ppm, more preferably 4 to 100 ppm, particularly 7 to 50 ppm, and especially 10 to 15 ppm, relative to the weight of the polyester.

The surface of an opaque substrate layer preferably exhibits a whiteness index, measured as herein described, in the range from 60 to 120, more preferably 80 to 110, particularly 90 to 105, and especially 95 to 100 units.

The copolymers of the primer coating composition are generally water-insoluble. The coating composition including the water-insoluble copolymers may nevertheless be applied to the polymeric film substrate as an aqueous dispersion or alternatively as a solution in organic solvent. Application from an aqueous medium is economically advantageous, avoids the potential explosive and toxicity hazards associated with the use of volatile organic solvents, and eliminates the problem of residual odour frequently encoumtered when an organic solvent is employed.

To achieve good wetting and levelling propertiesof the primer coating on a polymeric film substrate, it is desirable that the surface energy of the primer composition is less than that of the film substrate. Suitable reduction in surface tension can be achieved by the addition of one or more surfactants to the primer composition, for example alcohol ethoxylates, ethoxylated allkyl phenols, such as nonylphenoletlhoxylates, and alkylsulphates.

The primer composition may be applied to an already oriented film substrate. However, application of the primer coating is preferably effected before or during the stretching operation.

In particular, it is preferred that the primer coating should be applied to the film substrate between the two stages (longitudinal and transverse) of a biaxial stretching operation. Such a sequence of stretching and coating is especially preferred for the production of a coated linear polyester film substrate which is preferably firstly stretched in the longitudinal direction over a series of rotating rollers, coated with the primer composition, and then stretched transversely in a stenter oven, preferably followed by heat setting.

Prior to deposition of the primer coating onto the polymeric substrate, the exposed surface thereof may, if desired, be subjected to a chemical or physical surface-modifying treatment to improve the bond between that surface and the subsequently applied primer coating. A preferred treatment, because of its simplicity and effectiveness, which is particularly suitable for the treatment of a polyolefin substrate, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The primer composition may be applied to the polymeric film substrate as an aqueous dispersion or as a solution in an organic solvent by any suitable conventional coating technique such a gravure roll coating, reverse roll coating, dip coating, bead coating, slot coating or electrostatic spray coating. The solution or dispersion is suitably applied in an amount such that the thickness of the primer layer when dried, for example by heating the coated substrate, will provide an effective bond to any subsequently applied layer. For example, the primer coating may be applied to the substrate at a coat weight within the range 0.1 to 10 mg/dm$^2$, and typically within the range 0.2 to 5 mg/dm$^2$.

Modification of the surface of the primer layer, e.g. by flame treatment, ion bombardment, electron beam treatment, ultra-violet light treatment or preferably by corona discharge, may be used to further improve the adhesion of subsequently applied coatings.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

The surface of the substrate which is coated with the primer composition according to the first aspect of the invention is referred to herein as the primary side. The side of the substrate which is not coated with this primer composition is referred to herein as the secondary side.

The secondary side of the substrate may have thereon one or more further polymeric layers or coating materials.

Where coated with a coating material, the coating on the secondary side may be the same or different and preferably different from the primer composition on the primary side of the substrate. The coating of the secondary side is preferably performed using the techniques described herein at the same stage of the film-making process as the step of coating with the aforementioned primer layer on the primary side of the substrate. Modification of the surface of the additional coating layer on the secondary side to improve adhesion of subsequent coatings may be effected using the techniques described herein.

In one embodiment the additional coating on the secondary side may comprise a discontinuous layer of an acrylic and/or methacrylic polymeric resin, as described for component (ii) herein, and may optionally further comprise a cross-linking agent such as any of those described herein for component (iii). Where the additional coating on the secondary side comprises a cross-linking agent, the cross-linking agent is preferably used in amounts of up to 25%, and preferably at least 10%, based on the weight of the polymer in the additional coating layer. The additional coating layer may also comprise any of the additives conventionally employed in the manufacture of polymeric films as described herein. In particular, the additional coating layer may comprise a particulate filer, such as silica, of small particle size. Preferably, a filler, if employed, is present in an amount not exceeding 50% by weight of polymeric material, and preferably from about 5 to 15% by weight and especially about 10% by weight, and the particle size should be less than 0.5 μm, preferably less than 0.3 μm and especially 0.005 to 0.2 μm. The additional coating layer on the secondary side is a discontinuous layer which may be produced by applying a coat weight of less than 0.1 mg/dm$^2$. The thickness of the discontinuous additional coating is preferably about 0.004% to about 10% of the thickness of the substrate layer. Preferably, the thickness of the discontinuous additional layer is at least 0.01 µm and less than about 1.0 µm, and preferably less than 0.1 µm.

The discontinuous additional coating on the secondary side is of particular use as a "slip coating" to improve the handling properties, such as windability, of the film. The additional coating on the secondary side of the substrate is primarily intended for use wherein the substrate, or the outermost layer remote from the primer coating of a multilayer substrate, comprises a polymer other than a copolyester of terephthalic acid and isophthalic acid. The additional coating is of particular use wherein the substrate, or wherein the outermost layer remote from the primer coating of a multilayer substrate, comprises PET or PEN polyester.

As an alternative to a discontinuous layer of an acrylic and/or methacrylic polymeric resin, the secondary side may have thereon a "slip coating" comprising potassium silicate. Potassium silicate coatings are disclosed in, for example, U.S. Pat. Nos. 5,925,428 and 5,882,798, the disclosure of which is incorporated herein by reference.

As a further alternative to coating the secondary side with, for instance, a discontinuous additional coating, the secondary side of the substrate may have thereon one or more polymeric layers, which may be co-extruded with the substrate layer or laminated to the pre-formed substrate layer using conventional techniques.

In one embodiment, the additional polymeric layer on the secondary side of the substrate is a heat-sealable layer. The heat-sealable layer should begin to soften at a temperature such that the heat-seal bond can be formed at a temperature which is less than the melting temperature of the substrate layer. Preferably the heat-sealable layer should begin to soften at a temperature such that the heat-seal bond can be formed at a temperature which is between about 5 and 50° C. below, preferably between about 5 and 30°C. below, and preferably at least about 10° C. below the melting temperature of the polymer material of the substrate layer. Any suitable heat-sealable layer as known in the art may be used. For instance, the heat-sealable layer may comprise a copolyester of an aliphatic diol (e.g. ethylene glycol) and a cycloaliphatic diol (e.g. 1,4-cyclohexanedimethanol) with one or more dicarboxylic acids (e.g. terephlithalic acid), the heat-sealable layer desirably being substantially amorphous at all times. The preferred molar ratios of the cycloaliphatic diol to the aliphatic diol are in the range from 10:90 to 60:40, preferably in the range from 20:80 to 40:60, and more preferably from 30:70 to 35:65. A commercially-available example of such a polymer is PET™ 6763 (Eastman) which comprises a copolyester of terephthalic acid, about 33% 1,4-cyclohexane dimethanol and about 67% ethylene glycol. In a further embodiment, additional polymeric layers on the secondary side of the substrate may comprise, adjacent to the substrate layer, an adhesive layer and, adjacent to the adhesive layer, a peelable release layer, as are known in the art.

The primed substrate layer according to the second aspect of the invention may form the base layer in an anti-fouling composite film, the composite film comprising on the primed surface of the primed substrate layer an anti-fouling layer comprising a photo-catalyst. The composite film exhibits improved adhesion between the substrate and the anti-fouling layer, and preferably also exhibits improved weatherability characteristics.

The anti-fouling layer is the active layer in the composite film and may comprise, for instance, a photocatalytic oxide (such as titanium dioxide) and silica or silicone resin (such as those disclosed in EP-A-0903389). The anti-fouling layer is activated by sunlight or UV radiation. It is believed that the photo-catalyst present in the active layer produces free radicals upon exposure to UV radiation or sunlight and that the free-radicals then attack and break down substances which have accumulated on the surface of the film. The resultant decomposition products may be removed, for instance in the case of a composite film laminated to an exterior surface such as a window or mirror of an automobile, by the subsequent rinsing action of rainwater without extra maintenance. The composite film may therefore be used as a self-cleaning protective layer.

The composite film may also be used in situations where it is desired to avoid the formation of water droplets or fogging on a surface, such as a car window or mirror. The action of sunlight or UV radiation imparts hydrophilicity to the surface of the film, reducing the contact angle between the surface and a water droplet so that water droplets spread evenly on the surface, thereby improving visibility, and this effect is maintained on subsequent exposure to rain or water vapour.

The composite film may further comprise one or more additional layers between the primed substrate layer and the anti-fouling layer. Such additional layers may comprise a silicone derivative, for instance polymethyl silsesquioxane derivatives (particularly those having active silanol end groups). Such additional layers improve the compatability and therefore the adhesion between the primed substrate and the anti-fouling layer. The primer layer must, of course, exhibit good adhesion to such silicone-containing layers.

The thickness of the anti-fouling layer is typically from about 0.05 to about 10 µm, preferably about 0.1 to about 1.5 µm. The thickness of the additional layer, where present, is typically from about 0.05 to about 10 µm, preferably from about 0.1 to about 1.5 µm.

The composite film may be used as an external or protective layer for buildings and vehicles and other man-made structures and may be applied onto substrates including metal, ceramic, glass, plastic, wood, stone, cement, concrete, fibres, fabrics and papers. Applications include the use of the film in construction, for interior and exterior tiles, on windows and mirrors (interior and exterior) and particularly the windows and mirrors of automobiles, on road barriers and signs, on solar-cells, sign-boards and posters etc. The composite film is of particular use as a transparent film for lamination to glass substrates, for instance automobile windows or wing mirrors. Other applications of the composite film include use in the manufacture of sterlising air filters, automotive exhaust emissions filters, and self-cleaning tiles. The composite film may be applied to the surface of an article as part of the manufacturing process or may be retrofitted to an existing article.

The composite film may be prepared by providing a substrate layer and forming on one surface thereof a polymeric primer layer as herein described, and optionally forming an additional polymeric layer on the secondary surface of the primed substrate, and forming an anti-fouling-layer on said primer layer.

The primed substrate according to the second aspect of the invention may also be of use as, for example, an imagable copy film, or an ink-jet printable film, or for producing metallised films, drafting films, photographic films and magnetic cards.

In the case of an imagable copy film, the primed surface of the film may receive an image by electrostatic copying techniques using thermally fusible (thermoplastics) toner powder, or by a laser printer, according to conventional techniques known in the art. Metallised films may be formed by laminating a metal foil with, or by deposition of a metallic layer onto, the primed substrate according to conventional techniques in the art, for example as disclosed in EP-0429179-A. A drafting film may be produced by applying a lacquer layer, such as one or more polyvinyl alcohol and/or polyvinyl acetate resins, to the primed substrate according to conventional techniques in the art, for example as disclosed in EP-0429179-A. The primed substrate may also be coated with photographic emulsions (such as light-sensitive gelatinous silver halide emulsions, especially conventional X-ray emulsions) for producing a photographic film or a magnetic layer for providing magnetic cards.

The following test methods may be used to determine certain properties of the polymeric film:

(i) Wide angle haze is measured using a Hazegard System XL-211, according to ASTM D 1003-61.

(ii) 60° gloss value of the film surface is measured using a Dr Lange Reflectometer REFO 3 (obtained from Dr Bruno Lange, GmbH, Dusseldorf, Germany) according to DIN 67530.

(iii) L*, a* and b* colour co-ordinate values (CIE (1976)) and whiteness index were measured using a Colorgard System 2000, Model/45 (manufactured by Pacific Scientific) based on the principles described in ASTM D313.

(iv) The root mean square roughness (Rq) of the external surface of the polyester film substrate is measured using a Wyko Optical Profiler over a field of view of 0.9×1.2 mm.

(v) Adhesion strength is determined by the following method. A solvent silicone interlayer is coated on the surface of the primer layer and the sample dried in an oven at 120° for 4 minutes. A 4 cm strip of adhesive tape (SEWA tape (Nichiban)) is firmly applied to the surface and then peeled off. The area underneath the peel-zone is then assessed and expressed as a percentage. 100% adhesion corresponds to zero coating removed.

(vi) The polyester film was tested for ageing in an Atlas Ci65 Weatherometer under the following conditions—automatic irradiance of 0.50 Wm$^2$ at 340 nm employed, black panel temperature=63° C. (theoretical maximum temperature, wet bulb depression=10° C., conditioning water=30° C., weathering cycle=102 minutes light/18 minutes water, time of test=up to 1000 hours.

(vii) Tensile measurements (ultimate tensile strength (UTS) and % elongation) were measured using ASTM D882.

(viii) Brittleness was tested by visual inspection and the number of cracks in the film assessed.

The invention is further illustrated by the following examples. It will be appreciated that the examples are for illustrative purposes only and are not intended to limit the invention as described above. Modification of detail may be made without departing from the scope of the invention.

EXAMPLES

The following coating compositions were prepared.

Formulation A

|  | Actual Volume (litres) | % by weight solids in the formulation |
| --- | --- | --- |
| Component (i) | 9.78 | 3.912 |
| Component (ii) | 4.93 | 1.676 |
| Component (iii) | 2.99 | 0.598 |
| Ammonium sulphate | 0.42 | 0.084 |
| SYNPERONIC NP10 | 0.055 | 0.011 |
| Water | 31.83 | |

The ingredients are mixed according to conventional techniques and the resulting dispersion made up to 50 L with demineralised water. Thus, to 20 L of demineralised water were added components (i) to (iii) and SYNPERONIC NP10 with stirring. To the resulting dispersion was added 11.83 L demineralised water. The ammonium sulphate component is generally added just prior to use.

Component (i) is NEOCRYL BT70® (Avecia) which comprises a 20% solids aqueous dispersion of a copolymer of ethyl acrylate (EA; 37.5 mole %), methyl methacrylate (MMA; 37.5 mole %), itaconic acid (IA; 10 mole %) and p-styrene sulphonic acid (SSA; 15 mole %).

Component (ii) is AC201® (Rohm and Haas) which comprises a 46% solids aqueous dispersion of a copolymer of ethyl acrylate (EA; 48 mole %), methyl methacrylate (MMA; 48 mole %) and methacrylamlide (MA; 4 mole %).

Component (iii) is CYMEL 350® (Cytec Industries) which comprises a 10% solids aqueous dispersion (pH adjusted to 8.5 to 9) of partially hydrolysed hexamethoxymethyl melamine formaldehyde (90% methoxy and 10% methylol groups).

The ammonium sulphate is in the form of a 10% solution (pH adjusted to 9) and is present as a catalyst for the cross-linking agent.

SYNPERONIC NP10® (Uniqema) is a nonyl phenol ethoxylated surfactant (10% solution).

Formulation B

|  | Actual Volume (litres) | % by weight solids in the formulation |
| --- | --- | --- |
| Component (i) | 9.78 | 3.912 |
| Component (ii) | 4.93 | 1.676 |
| Component (iii) | 2.99 | 0.598 |
| Ammonium sulphate | 0.42 | 0.084 |
| SYNPERONIC NP10 | 0.055 | 0.011 |
| Water | 31.83 | |

Components (i) and (ii) are as for Formulation A. Component (iii) is CYMEL 300® (Cytec Industries) which comprises a 10% solids aqueous dispersion of hexamethoxymethyl melamine formaldehyde.

Formulation C

|  | Actual Volume (litres) | % by weight solids in the formulation |
| --- | --- | --- |
| Component (i) | 9.78 | 3.912 |
| Component (ii) | 4.93 | 1.676 |
| Component (iii) | 2.99 | 0.598 |

-continued

| | Actual Volume (litres) | % by weight solids in the formulation |
|---|---|---|
| Ammonium sulphate | 0.42 | 0.084 |
| SYNPERONIC NP10 | 0.055 | 0.011 |
| Water | 31.83 | |

Components (i) and (ii) are as for Formulation A. Component (iii) is MYCOAT 723® (Mitsui Cytec) which comprises a 10% solids aqueous dispersion of methoxymethyl melamine formaldehyde (>90% methoxy and <10% methylol groups).

Formulation D

| | Actual Volume (litres) | % by weight solids in the formulation |
|---|---|---|
| Component (i) | 9.78 | 3.912 |
| Component (ii) | 4.93 | 1.676 |
| Component (iii) | 2.99 | 0.598 |
| Ammonium Sulphate | 0.42 | 0.084 |
| SYNPERONIC NP10 | 0.055 | 0.011 |
| Water | 31.83 | |

Components (i) and (ii) are as for Formulation A. Component (iii) is EPOCROS™ K-2030E (Nippon Sholcubai Co. Ltd) which comprises a 38.8% aqueous emulsion of an oxazoline-functional copolymer (CAS Registry No. 137496-92-5).

Formulation E

| | Actual Volume (litres) | % by weight solids in the formulation |
|---|---|---|
| Component (i) | 5.16 | 2.064 |
| Component (ii) | 2.58 | 2.064 |
| Component (iii) | 2.065 | 0.413 |
| Ammonium Sulphate | 0.29 | 0.058 |
| SYNPERONIC NP10 | 0.15 | 0.030 |
| Water | 39.76 | |

Component (i) is as for Formulation A. Component (iii) is as for Formulation B. Component (ii) is SAIVINOL™ (Saiden Chemical Industry Company; Grades X-599-237E-1, X-599-237E-2, X-599-237E-3 and X-599-237E-4).

Coated Film Examples 1 and 2

A polymer composition comprising polyethylene terephthalate (84% by weight of the composition), ethylene terephthalate/ethylene isophthalate (82:18) copolyester (12% by weight of the composition) and a UV absorber (Tinuvin™ 1577FF; 4% by weight of the composition) was melt extruded, cast onto a cooled rotating drum and stretched in the direction of extrusion to approximately 3 times its original dimensions. The cooled stretched film was then coated on one side with Formulation A to give a wet coating thickness of 4 μm. The coated film was passed into a stenter oven at a temperature of 120° C. where the film was dried and stretched in the sideways direction to approximately 3 times its original dimensions. The biaxially stretched coated film was heat set at a temperature of about 230° C. (Example 1) or of about 210° C. (Example 2) by conventional means. The final film thickness was 50 μm.

Coated Film Examples 3 and 4

The procedure of Examples 1 and 2 was followed using Formulation B.

Coated Film Examples 5 and 6

The procedure of Examples 1 and 2 was followed using Formulation C.

Coated Film Example 7

The procedure of Example 1 was followed using a polymer composition comprising polyethylene terephthalate (88% by weight of the composition), ethylene terephthalate/ethylene isophthalate (82:18) copolyester (8% by weight of the composition) and a UV absorber (Tinuvin™ 1577FF; 4% by weight of the composition).

Coated Film Example 8

A composition comprising polyethylene terephthalate and Tinuvin™ 1577FF (2.3% by weight of the composition) was coextruded with a composition comprising ethylene terephthalate/ethylene isophthalate (82:18) copolyester and processed according to the method given in Example 1.

Coated Film Example 9

The procedure of Example 1 was followed except that the film was additionally coated on the reverse side with the following aqueous dispersion:

| | Actual Volume (litres) | % by weight solids in the formulation |
|---|---|---|
| Component (a) | 1.4 | 0.476 |
| Ammonium nitrate | 0.01 | 0.004 |
| SYNPERONIC NP10 | 0.225 | 0.045 |
| Water | 48.3 | — |

The ingredients are mixed according to conventional techniques and the resulting dispersion made up to 50 L with distilled water.

Component (a) comprises AC201® (Rohm and Haas) diluted with distilled water to produce a 17% solids aqueous dispersion of a copolymer of ethyl acrylate (EA; 48 mole %), methyl methacrylate (MMA; 48 mole %) and methacrylamide (MA; 4 mole %). The ammonium nitrate is in the form of a 20% aqueous solution. The coating on the reverse side of the film was a discontinuous coating.

Test Procedures

The coated film examples 1 to 9 were evaluated according to the test procedures described herein and the data obtained is presented in Table 1. Table 1 shows properties of the film both before and after ageing.

The test data show that the films of the present invention exhibit good adhesion and low haze. In particular, the haze and brittleness characteristics of the films do not exhibit significant deterioration on ageing. In addition, the adhesion properties of the films only begin to show signs of significant deterioration after 700 hours of SWOM ageing.

TABLE 1

| Film Example | Film Structure | Heat set temp. (° C.) | Haze (%) | Tensile Measurements (TD) | | Tensile Measurements (MD) | | Adhesion | Haze (%) after 700 hrs ageing | Adhesion after ageing | | | Film Brittleness after ageing | | |
|---|---|---|---|---|---|---|---|---|---|---|---|---|---|---|---|
| | | | | % elong | % UTS | % elong | % UTS | | | 198 hrs | 440 hrs | 700 hrs | 198 hrs | 440 hrs | 700 hrs |
| 1 | Mono | 230 | 1.4 | 160 | 15.1 | 238 | 10.9 | 1 | 3.1 | 1 | 1 | 2 | 1 | 1 | 1 |
| 2 | Mono | 210 | 2.4 | 124 | 23.4 | 159 | 20.3 | 1 | 2.9 | 1 | 1 | 3 | 1 | 1 | 1 |
| 3 | Mono | 230 | 1.4 | 151 | 14.8 | 204 | 11.5 | 1 | 4.4 | 1 | 1 | 3 | 1 | 1 | 1 |
| 4 | Mono | 210 | 1.9 | 131 | 24.4 | 152 | 20.8 | 1 | 3.9 | 1 | 1 | 2 | 1 | 1 | 1 |
| 5 | Mono | 230 | 1.3 | 146 | 14.5 | 203 | 11.5 | 1 | 2.9 | 1 | 1 | 2 | 1 | 1 | 1 |
| 6 | Mono | 210 | 2.3 | 126 | 24.8 | 155 | 21.1 | 1 | 4.2 | 1 | 1 | 2 | 1 | 1 | 1 |
| 7 | Mono | 230 | 0.6 | 147 | 19.5 | 190 | 13.4 | 1 | 1.8 | 1 | 1 | 2 | 1 | 1 | 1 |
| 8 | AB Coex | 228 | 0.5 | 141 | 16.1 | 145 | 15.7 | 1 | | 1 | | | 1 | | |

Adhesion
Grade 1 = 100%
Grade 2 = 50–99% adhesion
Grade 3 = <50% adhesion
Brittleness
Grade 1 = film intact, no cracks
Grade 2 = film cracks (i.e. film embrittled)

What is claimed is:

1. A composition comprising:
   (i) a copolymer of (a) 35 to 40 mole % alkyl acrylate, (b) 35 to 40 % alkyl methacrylate, (e) 10 to 15 mole % of a comonomer containing a free carboxyl group, and (d) 15 to 20 mole % of an aromatic sulphonic acid and/or salt thereof;
   (ii) an acrylic and/or methacrylic polymeric resin; and
   (iii) a cross-linking agent.

2. A composition according to claim 1 wherein component (i) is present in amounts from about 0.1 to about 15% by weight of the total solids present in the composition; component (ii) is present in amounts of about 0.1 to about 10% by weight of the total solids present in the composition; and component (iii) is present in amounts of about 0.01 to about 3% by weight of the total solids present in the composition.

3. A composition according to claim 1 wherein component (i) comprises ethyl acrylate/methyl methacrylate/itaconic acid/p-styrene sulphonic acid and/or a salt thereof in a ratio of 35/35/15/15 mole %.

4. A composition according to claim 1 wherein component (i) comprises ethyl acrylate/methyl methacrylate/itaconic acid/p-styrene sulphonic acid and/or a salt thereof in a ratio of 37.5/37.5/10/15 mole %.

5. A composition according to claim 1 wherein component (ii) is a copolymer comprising alkyl acrylate monomer units and alkyl methacrylate monomer units.

6. A composition according to claim 5 wherein component (ii) is a copolymer comprising ethyl acrylate and methyl methacrylate.

7. A composition according to claim 6 wherein component (ii) is a copolymer comprising about 35 to 60 mole % ethyl acrylate, about 30 to 55 mole % methyl methacrylate and about 2 to 20 mole % methacrylamide.

8. A composition according to claim 1 wherein component (iii) comprises melamine formaldehyde, wherein the melamine formaldehyde is optionally alkoxylated.

9. A polymeric film comprising a substrate of one or more layers of polymeric material and a primer layer, wherein said primer layer is a composition comprising:
   (i) a copolymer of (a) 35 to 40 mole % alkyl acrylate, (b) 35 to 40 % alkyl methacrylate, (c) 10 to 15 mole % of a comonomer containing a free carboxyl group, and (d) 15 to 20 mole % of an aromatic sulphonic acid and/or salt thereof;
   (ii) an acrylic and/or methacrylic polymeric resin; and
   (iii) a cross-linking agent.

10. A film according to claim 9 wherein said substrate comprises one layer.

11. A film according to claim 9 wherein said substrate comprises two layers.

12. A film according to claim 9 wherein the or each layer comprises a polyester.

13. A film according to claim 9 wherein the or each layer comprises a polyester selected from polyethylene terephthalate, polyethylene naphthalate, and a copolyester of terephthalic acid and isophthalic acid with one or more diols selected from the group consisting of aliphatic and cycloaliphatic diols.

14. A film according to claim 13, wherein said copolyester is a copolyester of ethylene isophthalate and ethylene terephthalate comprising from 15 to 20 mol % ethylene isophthalate and 85 to 80 mol % ethylene terephthalate.

15. A film according to claim 9 wherein the substrate further comprises a UV absorber, wherein the UV absorber may be present in the or any or each layer of the substrate.

16. A film according to claim 9 further comprising an additional layer on the surface of the substrate remote from the primer layer, wherein said additional layer comprises a discontinuous layer of an acrylic and/or methacrylic polymeric resin and optionally further comprises a cross-linking agent in amounts of up to 25% based on the weight of the polymer in the additional coating layer.

* * * * *